Sept. 22, 1942. H. A. BEEKHUIS, JR 2,296,328
ABSORPTION OF NITROGEN PEROXIDE
Filed Nov. 4, 1938
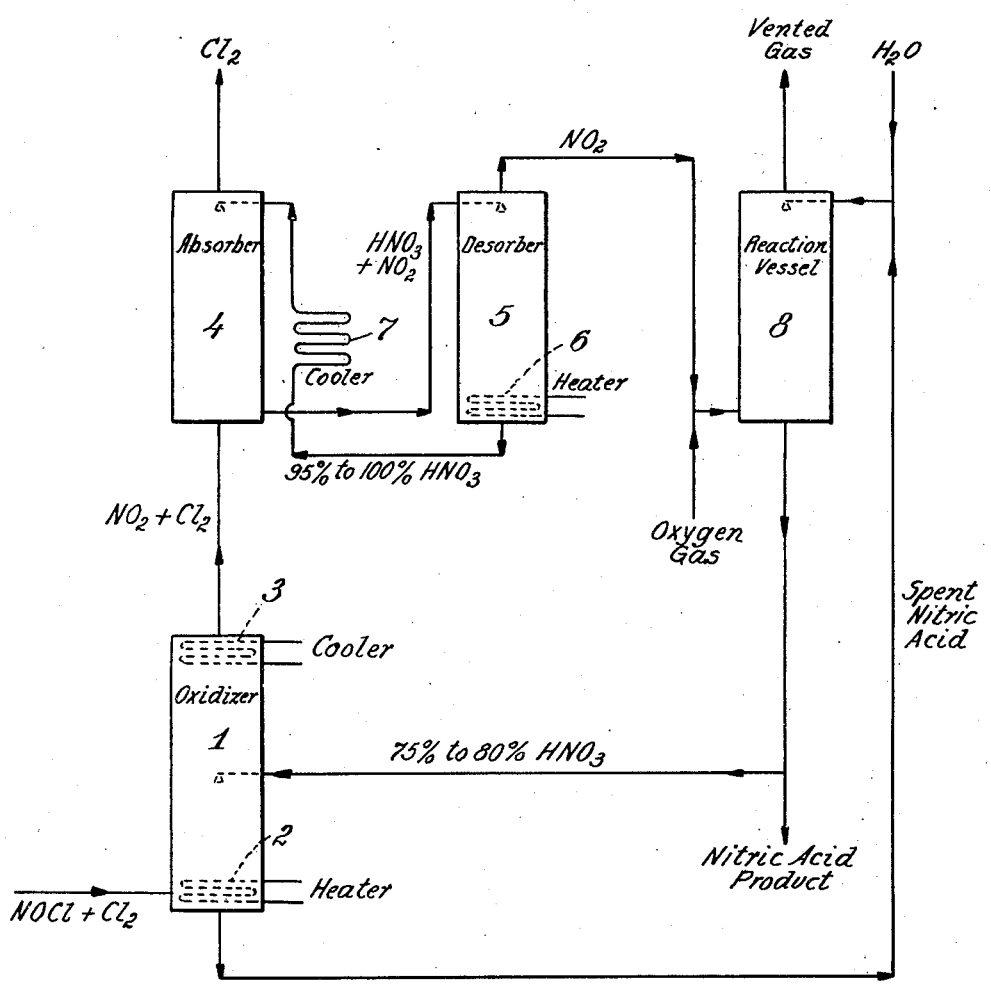
INVENTOR
Herman A. Beekhuis, Jr.
BY
ATTORNEY Patented Sept. 22, 1942

2,296,328

UNITED STATES PATENT OFFICE 2,296,328

ABSORPTION OF NITROGEN PEROXIDE

Herman A. Beekhuis, Jr., Petersburg, Va., assignor to The Solvay Process Company, New York, N. Y., a corporation of New York Application November 4, 1938, Serial No. 238,787

11 Claims. (Cl. 23—157)

This invention relates to a process for the separation and recovery of nitrogen peroxide from a gas containing it together with chlorine. The invention further relates to a process for treating a mixture of nitrosyl chloride and chlorine, such as may be obtained by the reaction of nitric acid with a metal chloride, to recover separately the chlorine present in the gas mixture both as free and combined chlorine and the fixed nitrogen contained therein as nitrosyl chloride.

It is known that nitrosyl chloride may be oxidized to produce a gas containing nitrogen peroxide, chlorine and more or less residual, undecomposed nitrosyl chloride. It is also known that nitrogen peroxide alone or together with oxygen reacts with water or with aqueous nitric acid solutions to form nitric acid. I have found that in the presence of chlorine nitrogen peroxide reacts with water or aqueous nitric acid to form nitric acid and nitrosyl chloride. I have now discovered, however, that highly concentrated nitric acid contacted with mixtures of nitrogen peroxide and chlorine may be used to absorb the nitrogen peroxide, leaving a substantially pure chlorine gas, without substantial reaction of the nitrogen peroxide and chlorine to form nitrosyl chloride.

Thus, I have discovered that when a mixture of nitrogen peroxide and chlorine is contacted with nitric acid containing 90% or more $HNO_3$ at temperatures below 40° C. the nitrogen peroxide is absorbed in the nitric acid without substantial reaction of the nitrogen peroxide and chlorine. If the nitrogen peroxide-chlorine gas contains nitrosyl chloride this also is absorbed in the nitric acid. Chlorine is but slightly soluble in the nitric acid and, accordingly, it is left as chlorine purified of nitrogen peroxide. The solution of nitrogen peroxide in 90% or stronger nitric acid withdrawn from contact with the chlorine may be heated to a temperature above 60° C. and absorbed nitrogen peroxide evolved from the solution. In thus recovering the nitrogen peroxide the solution is preferably heated at its boiling point until the nitrogen peroxide is substantially completely removed therefrom. Any nitrosyl chloride absorbed from the initial mixture of nitrogen peroxide and chlorine is evolved from solution with the nitrogen peroxide gas or oxidized to nitrogen peroxide and chlorine, depending upon the temperature and other conditions of heating the solution.

This invention further comprises the process for treating a mixture of nitrosyl chloride and chlorine gases by contacting the gases with a concentrated nitric acid containing 70% or more $HNO_3$ at a temperature of 50° C. or higher to oxidize the nitrosyl chloride to nitrogen peroxide and chlorine and maintaining in the acid at the point at which the gases are last contacted therewith 70 parts or more of $HNO_3$ for every 30 parts $H_2O$. For example, hot nitric acid is passed downwardly through an oxidation tower in countercurrent contact with a nitrosyl chloride-chlorine gas, with the acid introduced to the tower having a concentration of 70% or more $HNO_3$. A part of the $HNO_3$ is used up in reacting with the nitrosyl chloride and the spent acid of a lower concentration than that initially contacted with the nitrosyl chloride is withdrawn from the oxidation tower. The oxidized gas is then preferably cooled to below 40° C. to condense from it vapors of nitric acid and water. The condensate obtained by thus cooling the oxidized gases is withdrawn from contact with the oxidized gases as formed or is, preferably, refluxed in countercurrent contact with the gases. Substantial reformation of nitrosyl chloride by reaction of nitrogen peroxide and chlorine thus may be prevented during the cooling of the oxidized gases. The oxidized (and preferably also cooled) gases are passed in contact with 90% or stronger nitric acid at a temperature below 40° C. to absorb the nitrogen peroxide as described hereinabove.

Nitrogen peroxide recovered as a concentrated gas from solution in the nitric acid used for removing it from the chlorine is preferably reacted with oxygen or air and the spent acid withdrawn from the nitrosyl chloride oxidation tower to form 70% or stronger nitric acid for use in oxidizing additional nitrosyl chloride. If desired, sufficient water may be supplied to the spent acid for reaction with substantially all the fixed nitrogen recovered from the nitrosyl chloride as nitrogen peroxide and the excess of nitric acid thus obtained over that used for oxidizing nitrosyl chloride may be drawn off as a product of this process.

In carrying out the process of this invention, instead of using 90% or stronger nitric acid for absorption of nitrogen peroxide from admixture with chlorine, a concentrated nitric acid containing a small proportion of sulfuric acid, preferably not more than 30% sulfuric acid, may be used. For example, the nitrogen peroxide may be absorbed in a solution containing about 75% $HNO_3$, 20% $H_2SO_4$, and 5% $H_2O$. In general in carrying out the process of this invention the nitrogen peroxide is absorbed from the gas containing it together with chlorine by contacting the gas with nitric acid having a partial pressure of water vapor of about 1 mm. of mercury or less at a temperature of 25° C. Under these conditions the nitrogen peroxide is absorbed and separated from the chlorine without substantial reaction of the nitrogen peroxide and chlorine to form nitrosyl chloride.

The concentrated nitric acid used for oxidizing the nitrosyl chloride also may contain sulfuric acid or other material dissolved in the acid. The proportion of nitric acid and water contained in the liquid should, however, be such that when the liquid is heated at a temperature between 50° C. and the boiling point of the solution the vapors evolved from said solution contain 70 parts or more $HNO_3$ to every 30 parts $H_2O$.

The following example is illustrative of the invention. The process of this example is diagrammatically shown in the accompanying drawing.

With reference to the drawing, a gas containing about equal proportions of nitrosyl chloride and chlorine, such as may be obtained by reacting nitric acid and sodium chloride, is introduced into the bottom of an oxidizer 1 through which the gas passes upwardly. Concentrated nitric acid containing 75% to 80% $HNO_3$ is introduced into a mid-portion of the oxidizer and passes downwardly therein in contact with the nitrosyl chloride-chlorine gas. The bottom of the oxidizer is provided with a heater 2 whereby the acid in the lower portion of the oxidizer is heated to a temperature of about 100° C. or higher. The nitrosyl chloride in the gas thus contacted with the hot nitric acid is oxidized to nitrogen peroxide and chlorine, and these gases together with vapors of nitric acid and water and residual unoxidized nitrosyl chloride pass upwardly through the upper portion of oxidizer 1. The vapors and gases at the top of the oxidizer are cooled by a cooler 3 to condense nitric acid and water vapors. This condensate is refluxed downwardly in contact with the gases rising through the tower whereby the nitrosyl chloride is substantially completely oxidized and the dry gas leaving the top of the oxidizer substantially consists of a mixture of nitrogen peroxide and chlorine in the proportions of about 2 mols of $NO_2$ for every 1 mol of $Cl_2$. Spent acid is withdrawn from the bottom of oxidizer 1.

The mixture of nitrogen peroxide and chlorine is introduced into the bottom of an absorber 4 through which it passes upwardly in contact with a descending flow of 95% to 100% nitric acid introduced to the top of the absorber at a temperature of 20° to 40° C. The nitrogen peroxide is absorbed in the nitric acid. Heat is generated in absorbing the nitrogen peroxide and it is desirable to cool the acid in the absorber so as to maintain it at temperatures within the range of 20° to 40° C. With a mixture of nitrogen peroxide and chlorine passed into absorber 4 at the rate of 39 pounds per minute of $NO_2$ and 30 pounds per minute of $Cl_2$ and scrubbing the gas with about 200 pounds per minute of 95% to 100% nitric acid (equivalent to about 5 pounds of 95% to 100% nitric acid for every 1 pound of $NO_2$ in the gas to be treated), the nitrogen peroxide is substantially completely absorbed and a chlorine gas substantially free from nitrogen peroxide leaves the top of the absorber.

A solution of nitrogen peroxide in 95% to 100% nitric acid is drawn from the bottom of absorber 4 and is introduced to the top of a desorber or distillation column 5. By means of a heater 6 at the bottom of the desorber the solution is heated to its boiling point as it descends through desorber 5 and is boiled in the bottom of the desorber. The nitrogen peroxide is thus evolved from the solution and escapes from the top of the desorber. The nitric acid is drawn from the bottom of the desorber and, after being cooled in cooler 7, is returned to the top of absorber 4.

The concentrated nitrogen peroxide gas from desorber 5 is introduced into a reaction vessel 8 in which it is reacted with the spent nitric acid drawn from the bottom of oxidizer 1 and oxygen to form 75% to 80% nitric acid. Sufficient water is introduced into reaction vessel 8 together with the spent acid from oxidizer 1 to react with substantially all of the nitrogen peroxide. The acid drawn from reaction vessel 8 is divided and one portion is introduced into oxidizer 1 for oxidation of additional nitrosyl chloride. The remaining acid is withdrawn from the process as product.

This application is a continuation-in-part of my copending application Serial No. 126,619, filed February 19, 1937.

I claim:

1. The process for the absorption and separation of nitrogen peroxide from chlorine which comprises continuously circulating in a cyclic system nitric acid of a concentration of 90% or higher and in said system contacting said acid with a gaseous mixture of chlorine and nitrogen peroxide at a temperature below 40° C. to absorb the nitrogen peroxide, removing the resulting solution of nitrogen peroxide in nitric acid from contact with said gaseous mixture of chlorine and nitrogen peroxide, heating the thus separated solution to evolve nitrogen peroxide therefrom, cooling to a temperature below 40° C. the nitric acid from which nitrogen peroxide has been evolved, returning the cooled nitric acid into contact with said gaseous mixture of chlorine and nitrogen peroxide, maintaining said nitric acid at the point at which it is introduced into contact with said gaseous mixture and throughout its period of contact with the gaseous mixture at a concentration of 90% or higher, and thereby absorbing said nitrogen peroxide in said nitric acid without substantial reaction of the nitrogen peroxide and chlorine to form nitrosyl chloride.

2. The process for treating a mixture of nitrosyl chloride and chlorine to separately recover therefrom the chlorine both free and combined and the combined nitrogen which comprises passing said mixture of nitrosyl chloride and chlorine in direct contact with nitric acid at a temperature above 50° C., said nitric acid being of a concentration such that when heated at a temperature between 50° C. and its boiling point the vapors evolved therefrom contain 70 parts or more $HNO_3$ to every 30 parts $H_2O$, cooling the resulting mixture of gases containing nitrogen peroxide, chlorine and residual undecomposed nitrosyl chloride to condense therefrom nitric acid, refluxing the condensed nitric acid in countercurrent flow and in direct contact with said mixture of gases, passing the gas containing nitrogen peroxide and chlorine thus obtained at a temperature below 40° C. in direct contact with nitric acid in which, throughout the period of contact of the acid with said mixture and until the nitrogen peroxide is substantially completely absorbed from the chlorine, the ratio of $HNO_3$ to $H_2O$ is sufficiently high to prevent substantial reaction of said nitrogen peroxide and chlorine to form nitrosyl chloride, and withdrawing the resulting solution of nitrogen peroxide from contact with the chlorine unabsorbed from said gas.

3. The process for treating a mixture of nitrosyl chloride and chlorine to separately recover therefrom the chlorine both free and combined and the combined nitrogen which comprises passing said mixture of nitrosyl chloride and chlorine in direct contact with 70% or stronger nitric acid at a temperature above 50° C. to oxidize the nitrosyl chloride to nitrogen peroxide and chlorine, withdrawing the oxidized gas from contact with acid containing 70% or more $HNO_3$, cooling the gas containing nitrogen peroxide and chlorine thus obtained to condense the vapors of water and nitric acid contained therein, passing the thus cooled and dried gas in direct contact with nitric acid of a concentration of 90% or higher at a temperature below 40° C., said last mentioned nitric acid containing 90% or more $HNO_3$ when it is initially introduced into contact with the gas containing nitrogen peroxide and chlorine withdrawing the resulting solution of nitrogen peroxide from contact with the chlorine unabsorbed from said gas, heating the withdrawn solution to evolve a concentrated nitrogen peroxide gas therefrom, reacting nitrogen peroxide thus obtained with oxygen and spent acid from the oxidation of said nitrosyl chloride to form nitric acid containing 70% or more $HNO_3$ and employing acid thus produced or oxidation of additional nitrosyl chloride contained in said mixture of nitrosyl chloride and chlorine.

4. The process for treating a mixture of nitrosyl chloride and chlorine to separately recover therefrom the chlorine both free and combined and the combined nitrogen which comprises passing said mixture of nitrosyl chloride and chlorine in direct contact with nitric acid at a temperature above 50° C., said nitric acid being of a concentration such that when heated at a temperature between 50° C. and its boiling point the vapors evolved therefrom contain 70 parts or more $HNO_3$ to every 30 parts $H_2O$, cooling the resulting mixture of gases containing nitrogen peroxide, chlorine and residual undecomposed nitrosyl chloride to condense therefrom nitric acid, refluxing the condensed nitric acid in countercurrent flow and in direct contact with said mixture of gases, passing the gas containing nitrogen peroxide and chlorine thus obtained at a temperature below 40° C. in direct contact with nitric acid in which the ratio of $HNO_3$ to $H_2O$ is sufficiently high to prevent substantial reaction of said nitrogen peroxide and chlorine to form nitrosyl chloride, withdrawing the resulting solution of nitrogen peroxide from contact with the chlorine unabsorbed from said gas, heating the withdrawn solution to evolve a concentrated nitrogen peroxide gas therefrom, reacting nitrogen peroxide thus obtained with oxygen and spent acid from the oxidation of said nitrosyl chloride to form nitric acid of a concentration such that when heated at a temperature between 50° C. and its boiling point the vapors evolved therefrom contain 70 parts or more $HNO_3$ to every 30 parts $H_2O$, and employing acid thus produced for oxidation of additional nitrosyl chloride contained in said mixture of ntirosyl chloride and chlorine.

5. The process for treating a mixture of nitrosyl chloride and chlorine to separately recover therefrom the chlorine both free and combined and the combined nitrogen which comprises passing said mixture of nitrosyl chloride and chlorine in direct contact with 70% or stronger nitric acid at a temperature above 50° C. to oxidize the nitrosyl chloride to nitrogen peroxide and chlorine, withdrawing the oxidized gas from contact with said nitric acid at a point at which the nitric acid contains 70% or more $HNO_3$, cooling the gas containing nitrogen peroxide and chlorine thus obtained to condense the vapors of water and nitric acid contained therein, passing the thus cooled and dried gas in direct contact with nitric acid of a concentration of 90% or higher at a temperature below 40° C., said last mentioned nitric acid containing 90% or more $HNO_3$ when it is initially introduced into contact with the gas containing nitrogen peroxide and chlorine, withdrawing the resulting solution of nitrogen peroxide in nitric acid from contact with the chlorine unabsorbed from said gas, and heating the withdrawn solution to evolve a concentrated nitrogen peroxide gas therefrom.

6. The process for treating a mixture of nitrosyl chloride and chlorine to separately recover therefrom the chlorine both free and combined and the combined nitrogen which comprises passing said mixture of nitrosyl chloride and chlorine in direct contact with highly concentrated nitric acid at a temperature above 50° C., said nitric acid being of a concentration such that when heated at a temperature between 50° C. and its boiling point the vapors evolved therefrom contain 70 parts or more $HNO_3$ to every 30 parts $H_2O$, cooling the resulting mixture of gases containing nitrogen peroxide, chlorine and residual undecomposed nitrosyl chloride to condense therefrom nitric acid, refluxing the condensed nitric acid in countercurrent flow and in direct contact with said mixture of gases, passing the gas containing nitrogen peroxide and chlorine thus obtained at a temperature below 40° C. in direct contact with nitric acid in which, throughout the period of contact of the acid with said mixture and until the nitrogen peroxide is substantially completely absorbed from the chlorine, the ratio of $HNO_3$ to $H_2O$ is sufficiently high to prevent substantial reaction of said nitrogen peroxide and chlorine to form nitrosyl chloride, withdrawing the resulting solution of nitrogen peroxide in nitric acid from contact with the chlorine unabsorbed from said gas, heating the solution to evolve nitrogen peroxide therefrom, cooling to a temperature below 40° C. the nitric acid from which nitrogen peroxide has been evolved, and returning the cooled nitric acid into contact with said gaseous mixture of chlorine and nitrogen peroxide.

7. The process for treating a mixture of nitrosyl chloride and chlorine to separately recover therefrom the chlorine both free and combined and the combined nitrogen which comprises passing said mixture of nitrosyl chloride and chlorine in direct contact with 70% or stronger nitric acid at a temperature above 50° C. to oxidize the nitrosyl chloride to nitrogen peroxide and chlorine, withdrawing the oxidized gas from contact with said nitric acid at a point at which the nitric acid contains 70% or more $HNO_3$, cooling the gas containing nitrogen peroxide and chlorine thus obtained to condense the vapors of water and nitric acid contained therein, passing the thus cooled and dried gas in direct contact with nitric acid of a concentration of 90% or higher at a temperature below 40° C., said last mentioned nitric acid containing 90% or more $HNO_3$ when it is initially introduced into contact with the gas containing nitrogen peroxide and chlorine, withdrawing the resulting solution of nitrogen peroxide in nitric acid from contact with the chlorine unabsorbed from said gas, heating the withdrawn solution to evolve a concentrated nitrogen peroxide gas therefrom, cooling to a temperature below 40° C. the nitric acid from which nitrogen peroxide has been evolved, and returning the cooled nitric acid of a concentration of 90% or higher into contact with said gaseous mixture of chlorine and nitrogen peroxide.

8. The process for the absorption and separation of nitrogen peroxide from chlorine which comprises continuously circulating in a cyclic system nitric acid of a concentration of 95% to 100% and in said system contacting said acid with a gaseous mixture of chlorine and nitrogen pergaseous oxide at a temperature below 40° C. to absorb the nitrogen peroxide, removing the resulting solution of nitrogen peroxide in nitric acid from contact with said gaseous mixture of chlorine and nitrogen peroxide, heating the thus separated solution to evolve nitrogen peroxide therefrom, cooling to a temperature below 40° C. the nitric acid from which nitrogen peroxide has been evolved, returning the cooled nitric acid into contact with said gaseous mixture of chlorine and nitrogen peroxide, maintaining said nitric acid at the point at which it is introduced into contact with said gaseous mixture and throughout its period of contact with the gaseous mixture at a concentration of 95% to 100% HNO₃, and thereby absorbing said nitrogen peroxide in said nitric acid without substantial reaction of the nitrogen peroxide and chlorine to form nitrosyl chloride.

9. The process for the absorption of nitrogen peroxide and its separation from chlorine which comprises introducing into contact with a gas containing chlorine and nitrogen peroxide a highly concentrated nitric acid which, when initially contacted with said gas and throughout its period of contact therewith, has a water vapor pressure of about 1 mm. of mercury or lower at a temperature of 25° C., maintaining said gas and concentrated nitric acid at a temperature below 40° C. throughout their period of contact, and thereby absorbing said nitrogen peroxide from said gas without substantial reaction of the nitrogen peroxide and chlorine to form nitrosyl chloride.

10. The process for the absorption of nitrogen peroxide and its separation from chlorine which comprises introducing into contact with a gas containing chlorine and nitrogen peroxide a highly concentrated nitric acid which, when initially contacted with said gas and throughout its period of contact therewith has a concentration of 90% HNO₃ or higher, maintaining said gas and concentrated nitric acid at a temperature below 40° C. throughout their period of contact, and thereby absorbing said nitrogen peroxide from said gas without substantial reaction of the nitrogen peroxide and chlorine to form nitrosyl chloride.

11. The process for the absorption of nitrogen peroxide and its separation from chlorine which comprises introducing into contact with a gas containing chlorine and nitrogen peroxide a highly concentrated nitric acid which, when initially contacted with said gas and throughout its period of contact therewith, has a concentration of 95% to 100% HNO₃, maintaining said gas and concentrated nitric acid at a temperature below 40° C. throughout their period of contact, and thereby absorbing said nitrogen peroxide from said gas without substantial reaction of the nitrogen peroxide and chlorine to form nitrosyl chloride.

HERMAN A. BEEKHUIS, JR.

CERTIFICATE OF CORRECTION.

Patent No. 2,296,328. September 22, 1942.

HERMAN A. BEKKHUIS, JR.

It is hereby certified that error appears in the printed specification of the above numbered patent requiring correction as follows: Page 2, second column, line 55, claim 2, after "with" insert --highly concentrated--; page 3, first column, line 30, claim 3, for the words "produced or" read --produced for--; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.